May 13, 1947. H. H. McKEE ET AL 2,420,549
MEAT TREATMENT
Filed Dec. 5, 1941 5 Sheets-Sheet 1

Harry H. McKee,
Charles L. Straeten and
Nicholas J. Dziedzic
INVENTORS

ATTEST -

BY
ATTORNEY

May 13, 1947.　　H. H. McKEE ET AL　　2,420,549
MEAT TREATMENT
Filed Dec. 5, 1941　　5 Sheets-Sheet 4

Harry H. McKee,
Charles L. Straeten and
Nicholas J. Dziedzic
INVENTORS

ATTEST-

BY R. G. Story
ATTORNEY

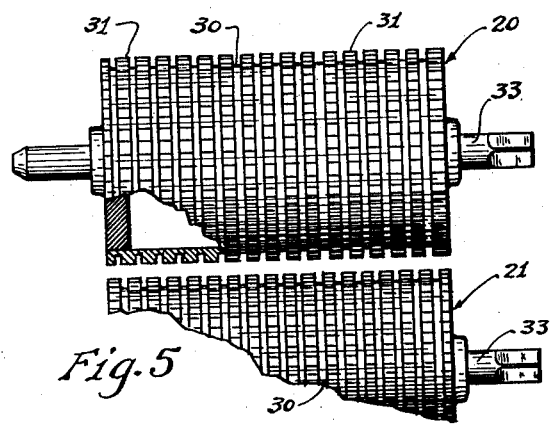
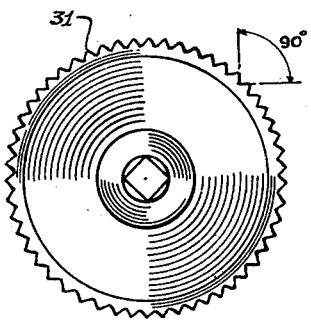
Fig.5  Fig.6
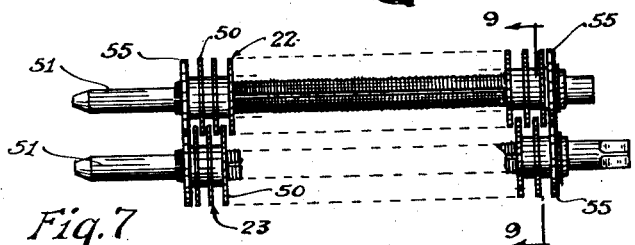
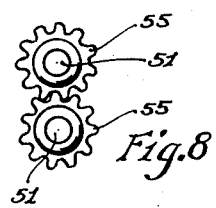
Fig.7  Fig.8
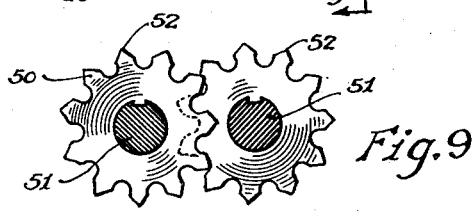
Fig.9
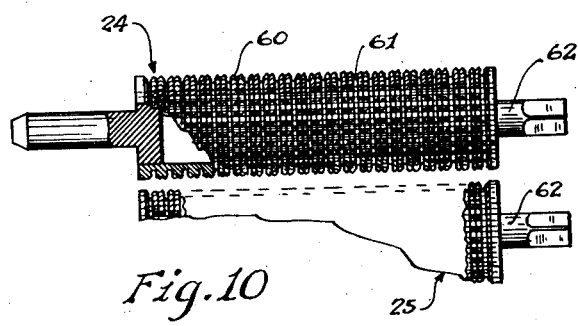
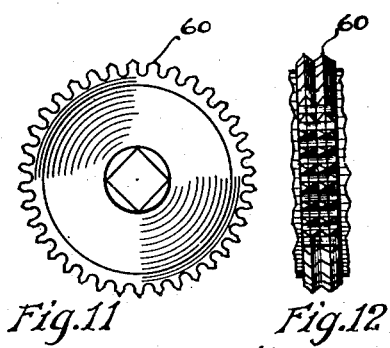
Fig.10  Fig.11  Fig.12

Patented May 13, 1947

2,420,549

UNITED STATES PATENT OFFICE 2,420,549

MEAT TREATMENT

Harry H. McKee, Nicholas J. Dziedzic, and Charles L. Straeten, Chicago, Ill., assignors to Industrial Patents Corporation, Chicago, Ill., a corporation of Delaware Application December 5, 1941, Serial No. 421,754

7 Claims. (Cl. 17—26)

This invention relates to the treatment of meat.

It is a particular object of the invention to provide a method for tenderizing meat.

It is another object of the invention to provide a machine for tenderizing a meat product.

Other objects will appear from the description given below.

In the drawings:

Figure 3a is a perspective view showing the hand guard at the entrance to the machine.

Fig. 5 is a detailed plan view of the flattening rollers.

Fig. 6 is an end view of one of the rollers shown in Fig. 5.

Fig. 7 is a detailed plan view of the tenderizing rollers.

Fig. 8 is an end view of the tenderizing rolls showing the intergeared drive connection.

Fig. 9 is a sectional view taken on line 9—9 of Fig. 7.

Fig. 10 is a plan view of the frenching rollers.

Fig. 11 is an enlarged end view of one of the frenching rollers shown in Fig. 10.

Fig. 12 is a detail in enlarged scale showing the configuration of the surface of the frenching rolls.

Fig. 14 is a sectional detail showing the splined type drive rod connection of the drive rod for adjusting the flattening and frenching rollers laterally.

Figure 16 is a perspective view showing the pin and slot connection between the bearing support and the crossbeam support for the stripping means associated with the flattening rollers, where this crossbeam is supported from the movable side bearing means.

Figure 17 is a perspective view of the slotted cross-beam and pin connection between the bearing support and the crossbeam support for the strippers associated with the frenching rollers, where this crossbeam is supported from the movable side bearing means.

It has been proposed in the past to treat chunks of meat to tenderize the product by passing the meat through a pair of cooperating rollers which have outwardly extending cutting blades that pass into the body of meat to cut or break the relatively tough fibers. Machines for doing this work are now available.

The present invention is an improvement on this prior art type of meat treating machine and provides means acting upon the meat to condition the meat before and after being tenderized so that a more tender and pleasing product is obtained.

Figure 3:
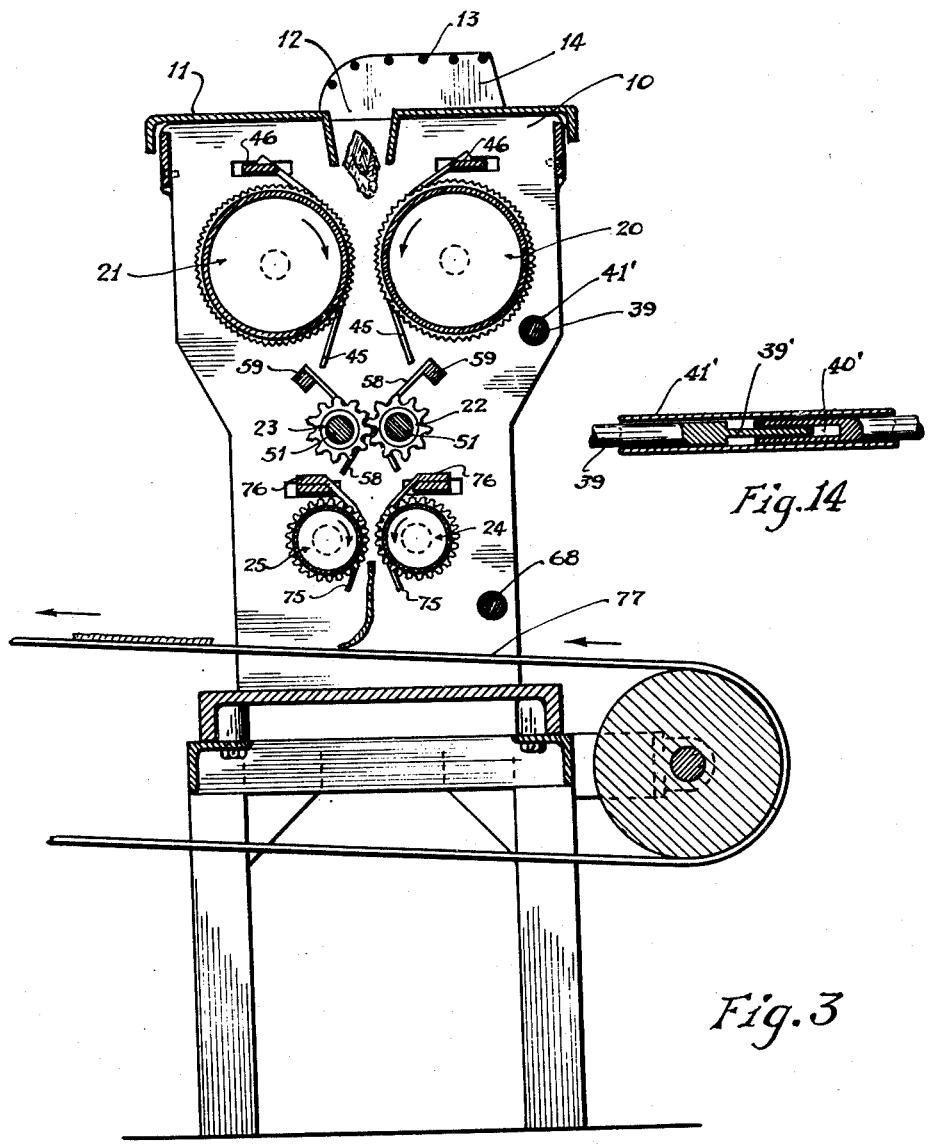
Fig. 3 is a sectional elevation looking from one end of the machine and taken on line 3—3 of Fig. 2, but showing in addition a section through the cover.

Referring to the drawings, in Fig. 3 cooperating rollers 22 and 23 are the conventional tenderizing means above described.

A pair of meat flattening and stretching rollers 20 and 21 are positioned substantially vertically above tenderizing rolls 22 and 23, and a pair of frenching rolls 24 and 25 are disposed vertically below tenderizing rolls 22 and 23. The action of each of these pairs of rollers will be described more fully below.

All of these rollers are rotatably mounted in suitable bearing supports within a housing 10. The housing is closed to protect the operator from coming in contact with any of the rollers and a cover 11 having an opening 12 is provided through which a chunk of meat may be fed into the rollers. A wire bar guard 13 is fixedly secured to the cover 11 and extends horizontally away from the opening 12. The guard 13 is provided with an opening 14 just large enough to insert the hand, and the operator may pass a chunk of meat inwardly through the guard to the opening 12 but due to the sharp right angled turn, he cannot put his hand into the machine, where it might be engaged by the meat treating rolls.

The meat dropping through opening 12 falls into the flattening and stretching rollers 20 and 21. Rollers 20 and 21 are driven to rotate in the direction of the arrows as shown in Fig. 3, and the chunk of meat fed through the opening 12 is flattened and stretched from its original shape to be approximately one-half an inch thick. Rollers 20 and 21 are both of the same size and have a relatively large diameter as compared with the size of the chunk of meat in order that they will act somewhat as a funnel to catch the meat falling through opening 12, whereby it is positively directed between the rollers to be stretched and flattened.

Rollers 20 and 21 are shown more in detail in Figs. 5 and 6, and it is seen that the generally cylindrical rollers are provided with a plurality of spaced channels 30 between which are disposed the rows of teeth 31. It will be noted that the rows of teeth 31 on roller 20 are disposed opposite the spaces 30 on roller 21 so that, while the meat is being flattened, its physical structure will not be crushed or macerated. The width of the space 30 is substantially less than the width of a row of teeth so that, while the rows of teeth on one of the opposed rollers are disposed opposite the spaces on the other roller, there are opposed surfaces of the rollers for positively flattening the chunk of meat passing between the rollers. However, the channels cooperate with the teeth in the flattening process by providing a space into which the meat being treated can expand; otherwise it might be crushed. The channels also provide means whereby the strippers described below coact with the rollers. The teeth 31 are shaped to be triangular in their vertical cross section so that the meat will be positively engaged and drawn between the rolls.

Figure 1:
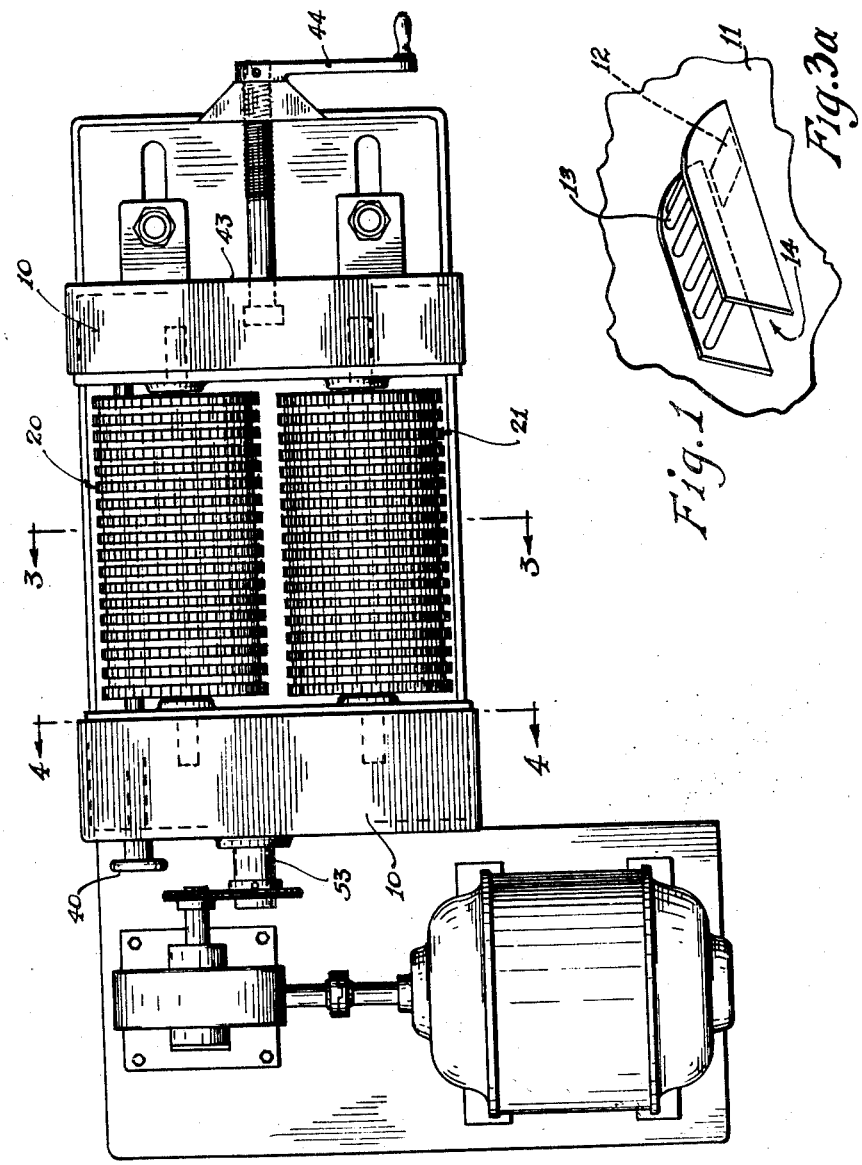
Fig. 1 is a plan view of the machine with the cover and strippers removed.
Figure 2:
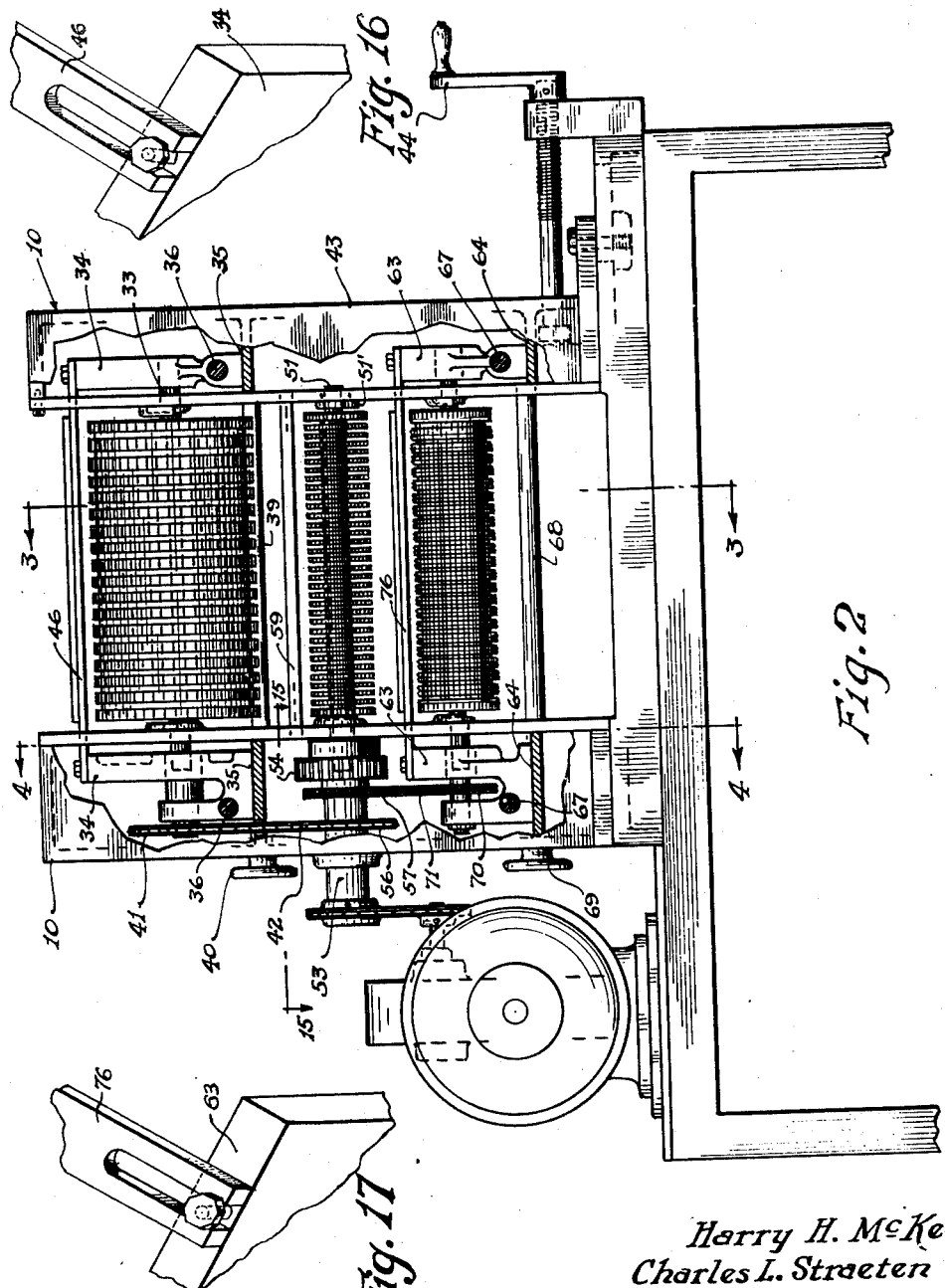
Fig. 2 is a side elevation of the machine partly broken away and with the side covering and top cover removed showing the stripper mounting but with the strippers removed.
Figure 4:
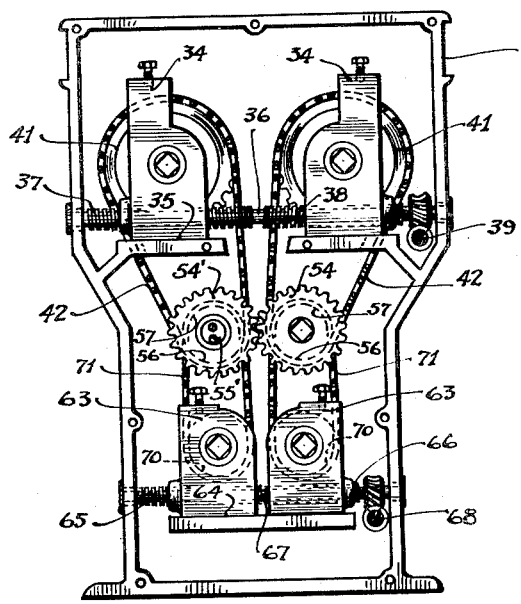
Fig. 4 is a sectional elevation of the drive end of the machine taken on line 4—4 of Fig. 1.

Rollers 20 and 21 are mounted for horizontal adjustment toward and away from each other, as shown in Figs. 2 and 4, and to effect this adjustment, the bearing shafts 33 upon which they are mounted are journaled at both ends in laterally slidable bearing supports 34. The pairs of bearing supports 34 at each end of the rollers slide upon and are supported on the surface 35 and each pair of bearing supports 34 has threaded engagement with a drive shaft 36. Each drive shaft 36 has a right hand threaded portion 37 and a left hand threaded portion 38 formed thereon, and each of these oppositely threaded portions cooperates with the different members of the pairs of bearing supports 34 to adjust the rollers simultaneously toward or away from each other when shafts 36 are rotated. Any suitable means for driving shafts 36 may be provided, and, as shown, each shaft is driven through a worm drive from shaft 39 by hand wheel 40 integral therewith.

Each shaft 33 has a squared end to fit into a square hole cut into the hubs of sprockets 41 rotatably carried in bearing supports 34. The fit of the squared shaft end in the hole is such that the shaft may be readily disconnected for cleaning purposes. The sprockets are driven by chains 42 as will appear more fully hereinafter, and this drive arrangement permits the rolls to be adjusted laterally as required. The ends of shafts 33 opposite the square ends, are adapted to have a sliding fit in their bearing supports 34 so that, in assembling the machine, the drive ends of the rollers may be placed in position in the hubs of sprockets 41 and then the opposite end wall 43 of the machine, see Fig. 2, is driven inwardly by crank 44. The inner end of crank 44 is rotatably supported in and engages a fixed abutment integral with the wall to carry the wall in or out as the crank is driven through suitable threads fixed to the base of the machine. The ends of shafts 33 are directed into the bearings in supports 34 and the wall 43 moving inwardly carries the bearings into proper position for operation.

Figure 13:
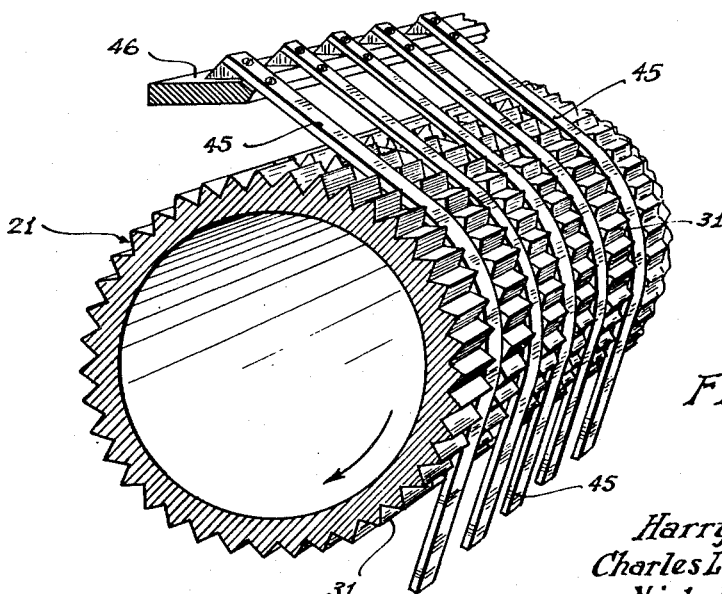
Fig. 13 is a detail view showing a perspective of the strippers used to remove the meat from rollers. In this view, the strippers are shown associated with the flattening rolls.

The meat after passing between rollers 20 and 21 is positively removed from these rollers by the stripping means 45, best shown in Figs. 3 and 13, which prevents the meat from adhering to either of the rollers to be carried around therewith. The stripping means is formed of relatively rigid members comprising bars of a width to pass into channels 30, as best shown in Fig. 13, and configured to act as a guide means to direct the meat into the rollers as well as to strip the meat from the rolls after being flattened and stretched. The bars are supported from the cross beams 46 mounted on supports 34 at the opposite ends of each of the rollers as shown in Figure 2, so that each stripping means is carried by supports 34 laterally with its respective roll during adjustment. The crossbeams have slots for engaging pins on supports 34 so that the stripping means may be readily disconnected along with its corresponding roll during cleaning of the machine.

The meat so stripped from rolls 20 and 21 falls by gravity to the tenderizing rollers 22 and 23, which engage the meat and draw it through the space between them, and the upstanding knife members of these rolls pass into the meat to sever the fibers and meat particles constributing to its toughness. These tenderizing rollers are shown more in detail in Figs. 7, 8 and 9 and they may be formed by keying a plurality of plates 50 on shafts 51 with suitable spacing means therebetween. The plates 50 on the opposed rollers are offset so they may be interfitted as shown in Figs. 7 and 9, and the plates being keyed to the shafts revolve therewith so that the meat, in passing through the tenderizing rollers, is subjected to a thorough fiber cutting process. The plates 50 including the upstanding knife portions 52 are the conventional tenderizing rollers known to the prior art. The plates 50 are shown keyed to shaft 51 in order that they may be readily removed and sharpened. It is obvious, of course, that they could be formed integrally with the shaft.

Figure 15:
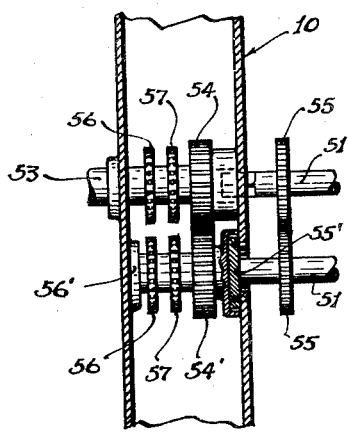
Fig. 15 is a sectional view taken on line 15—15 of Fig. 2 showing the drive means for all the rollers.

The tenderizing rollers are driven from drive shaft 53, driven by any conventional power means, through the hub of spur gear 54 as shown in Fig. 15. The hub of this gear is supported in suitable bearings and provided with a square aperture into which the squared end of one of the shafts 51 fits. The other shaft 51 is rotatably supported in bearings and is driven from the first shaft by the intergeared spur gears 55.

Spur gear 54 drives gear 54' the hub of which is rotatably mounted between the internal bearing 55' and bearing 56'. The hubs of gears 54 and 54' each have sprocket wheels 56 and 57 fixedly secured thereto and these sprocket wheels drive sprocket chains for driving the pairs of flattening and frenching rolls.

The ends of the bearing shafts 51 opposite to the driven ends are journaled in bearings 51' carried in wall 43. The shafts 51 have a longitudinally sliding fit with these bearings 51' so that the tenderizing rolls may be assembled by mounting shafts 51 in the drive end bearings and then moving wall 43 inwardly until bearings 51' have been moved along shafts 51 into operative position.

Stripping means having bars 58 supported from cross-beams 59 cooperate with rollers 22 and 23, and the bars 58 are of such width as to readily fit between plates 50 of the tenderizing rolls to insure that the meat will not adhere to either of these rolls. Crossbeams 59 are supported in a manner whereby they may be readily dismounted along with rollers 24 and 25 during clean-ups.

The meat stripped from the rolls 22 and 23 falls into the frenching rollers 24 and 25 and the frenching rollers operate against the surface of the tenderized meat to close the openings made by the knife members 52 which pass into the body of the meat. The frenching rollers, by forcing a portion of the meat into these openings, close them to inhibit the loss of the natural juices in the meat, some of which may have been freed by the cutting. The frenching rollers further serve to give the surface a more uniform and pleasing appearance, making the product more attractive to the user.

The frenching rollers are shown in Figs. 10, 11 and 12, and include rows of teeth 60, which have spaces 61 therebetween. The rows of teeth on roller 24 are offset with respect to the rows of teeth on roller 25 so that the teeth on one roller overlap the spaces on the opposite roller. The rows of teeth are individually configured as shown in Fig. 12 to form two parallel rows of little pyramids, and are designed to act against the surface of the meat, as above explained.

The frenching rollers 24 and 25 are mounted for horizontal adjustment toward and from each other, exactly as are the flattening rolls 20 and 21. The shafts 62 of these rollers are carried in laterally adjustable bearing supports 63. These supports ride on surface 64 and are simultaneously adjusted toward or away from each other by right and left hand threads 65 and 66 respectively of drive shaft 67. Shaft 67 is driven by a worm drive from shaft 68 which in turn is driven by hand wheel 69. The laterally adjustable bearing supports 63 at each end of both of the shafts 62 are movable so that the rolls are maintained parallel as they are adjusted.

The frenching rollers are driven by sprockets 70 each of which has a hub provided with a square hole for slidably engaging the squared ends of shafts 62. Sprockets 70 are driven by chains 71 that are in turn driven by sprockets 57. The opposite ends of the shafts 62 have a sliding fit in the bearings carried by bearing mountings 63, supported from movable end wall 43, whereby these rolls are assembled in the machine, in the same manner as the flattening rolls, by merely driving the end wall 43 inwardly by crank 44 after the ends of shafts 62 have been placed in alignment with the bearings.

Stripping bars 75, mounted on crossbeams 76, cooperate with the frenching rollers to strip the meat from these rollers and crossbeams 76 are carried on bearing supports 63 so that the strippers move laterally with the rolls in all positions of adjustment. The crossbeams are carried similar to crossbeams 46 and can be removed along with rolls 24 and 25. The meat stripped from the frenching rolls falls upon a conveyor 77 which delivers the meat to the outlet of the machine.

The three pairs of rollers are all driven from the single drive shaft 53 so that their surface speed is approximately the same. The tenderizing rolls are intergeared and both are thus positively driven from the hub of gear 54 and the flattening rollers are each driven from the sprockets mounted on the hubs of gears 54 and 54' through sprocket chains 42 that engage sprocket wheels 41 and 56. Frenching rollers 24 and 25 are each similarly driven from the sprockets 57 mounted on the hubs of gears 54 and 54' by chains 71 which cooperate with sprocket wheels 70.

The manner in which the various pairs of rollers are assembled in the machine has been described above. As most clearly seen from a comparison of Figs. 5, 7, and 10, the ends of the bearing shafts, supported from wall 43, are of different lengths. Shafts 62 of the frenching rollers are the longest and are first placed in alignment with their bearings, as the wall 43 is driven inwardly by crank 44. Shafts 51 of the tenderizing rolls are shown to be next longest, and after the shafts 62 have been properly started and are carried by their bearings, these tenderizer roll bearing shafts can be aligned with their bearings so that as the wall is driven further inwardly they are engaged in their bearings 51'. Shafts 33 are shown to be the shortest and are aligned and engaged in their bearings upon further inward movement of the wall. By providing shafts of different length, the operator is permitted to conveniently assemble the machine by adjusting each pair of roller shafts into alignment with their respective bearings, one at a time. This is an important advantage because the machine must be disassembled frequently for cleaning and this construction permits a much more rapid assemblage of the machine than could be accomplished if all the bearing shafts had to be simultaneously adjusted. It is to be understood, of course, that the lengths of the shafts need not be designed in the order shown with the longest shafts on the lowermost rollers. This arrangement is most convenient but the lengths may be varied at will and as long as several different shaft lengths are used, this resulting ease of assemblage may be attained.

The cross beams 46, 59 and 76 for supporting the strippers, are assembled along with the rollers. Their releasable fit permits them to be engaged in proper position as the wall 43 is driven inwardly to carry its bearings into supporting position with respect to the bearing shafts of the rollers. It is to be noted that the drive shafts 39 and 68, which cooperate in driving the bearing mountings 34 and 63 laterally for adjustment, are extensible so that wall 43 may be moved out and in. As best shown in Fig. 14, shaft 39 is divided and the two sections are keyed together by a spline type joint. The joint permits relative longitudinal movement between two parts of shaft 39, yet a positive drive is always maintained through the tongue 39' engaged in keyway 40'. If desired a cylindrical cover 41' can be placed over shaft 39 and this cover may be made to engage the inside surface of the walls of the machine to limit the inward movement of wall 43. A similar extensible construction is provided for drive shaft 68.

In using this machine, meat in any form may be fed to it, but preferably meat which has previously been frozen is subjected to this processing. It has been found, when meat maintained between 16° F. to 30° F. is put through this machine to be treated, that the final product has a better color, less of the natural juices will have been lost, there will be less loss due to shredding or tearing off of meat particles, and a more tender product is obtained.

In passing through the machine, the meat, whether frozen or not, is first conditioned by flattening and stretching it so that the tenderizing rollers can more efficiently perform their function. The flattening rollers 20 and 21 perform this step. When a frozen product is subjected to this flattening and stretching, apparently the fibers of the meat, being somewhat brittle, are maintained in a stretched condition due to the relatively hard or non-resilient condition of the meat, whereby they may be more easily broken when the flattened meat is subjected to the tenderizing step.

The stretched and flattened meat is then subjected to the tenderizing step, and the fingers of these tenderizing rollers reach into the body of the meat to sever the stretched fibers and to cut the stringy portions of the meat.

The flattened, stretched and tenderized chunk of meat is then passed to the frenching rollers, where a portion of the surface meat is forced into the holes produced by the knife members of the tenderizing rollers, and as above explained, this tends to seal in meat juices some of which would normally tend to flow out through the holes. The frenching rollers also impress their design on the surface of the meat and in making the surface quite uniform, the appearance of the meat is improved so that it is more attractive to the ultimate consumer.

The action of the stripping means will be readily understood from an inspection of the drawings. The stationary bars cooperating with the individual rollers fit into the channels provided therein and force the meat to be lifted from the rollers as they revolve. A particular advantage of the stripper means here shown resides in the provision of a single supporting means for and above each bank of stripper bars. The lower ends of the bars extend freely below the rollers and any shreds of meat torn from the product being treated will fall down past these ends through the machine onto the roller below or the conveyor. It is seen that with this stripper construction, a means is provided which is so disposed that there can be no accumulation of shreds such as would otherwise require frequent removal.

While the preferred embodiment of the invention has been shown, it is obvious that many modifications of the invention may be made. It is conceivable that very good results could be had by flattening and stretching the product by manual hammering before subjecting it to the action of the tenderizing and frenching rollers. Further, if the appearance of the meat is of little consequence, the frenching rollers could well be omitted, and the flattening and tenderizing rolls alone could be used to treat the meat.

These and other modifications which one skilled in the art would make are contemplated to be within the scope of the invention as defined by the following claims.

We claim:

1. A method for tenderizing a meat product comprising stretching the product to place the fibers under a stress, then subjecting the stretched product to a physical tenderizing step during which the stressed fibers are severed, and thereafter treating the surface of the tenderized product to substantially close openings therein to inhibit the loss of natural juices from the product which are freed upon severance of the fibers and to improve its appearance.

2. In a machine for tenderizing a chunk of a meat product, means for stretching and flattening the chunk, and means for breaking the fibers contributing to the toughness of the product, at least one of said means including elements extending into the chunk, and means acting thereafter against the surface of said chunk to force a portion of the surface meat into the openings produced by said elements to inhibit the loss of the natural juices of the meat product through the openings.

3. In a machine for tenderizing a chunk of a meat product, a pair of cooperating rollers for stretching and flattening the product, means for breaking the fibers contributing to the toughness of the product, and a pair of cooperating rollers for sealing the surface of the tenderized product, said pairs of rollers and said means being disposed in substantial vertical alignment, and each roller of each of said pairs of rollers being simultaneously adjustable horizontally toward or away from the other roller.

4. In a machine for tenderizing a chunk of a meat product, a pair of cooperating rollers for stretching and flattening the product, means for breaking the fibers contributing to the toughness of the product, and a pair of cooperating rollers for sealing the surface of the tenderized product, said pairs of rollers and said means being disposed in substantially vertical alignment, stripping means cooperating with each of said pairs of rollers, said stripping means including spaced fingers passing from above said pairs of rollers between the cooperating surfaces and having their free lower ends extending below the pairs of rollers, said stripping means serving to remove the chunk of meat being treated from the rollers between which it is passing and the free lower ends of the stripping means permitting all scraps to fall through the machine.

5. In a machine for tenderizing a chunk of a meat product, a pair of cooperating rollers for stretching and flattening the product, means for breaking the fibers contributing to the toughness of the product, and a pair of cooperating rollers for sealing the surface of the tenderized product, said pairs of rollers and said means being disposed in substantially vertical alignment, the individual rolls of each of said pairs of rolls being simultaneously adjustable horizontally toward or away from each other, stripping means cooperating with each of said pairs of rollers, said stripping means including spaced fingers passing from above said pairs of rollers between the cooperating surfaces and having their free lower ends extending below the pairs of rollers, said stripping means being adjustable horizontally with the rollers, said stripping means serving to remove the chunk of meat being treated from the rollers between which it is passing and the free lower ends permitting all scraps to fall through the machine.

6. In a machine for tenderizing a chunk of a meat product having a plurality of cooperating rollers for engaging the meat, each of said rollers being mounted on a shaft having an inner and outer end, bearing means for the ends of each of said shafts, said bearing means for the inner ends of the shafts being carried in supporting means disposed at the inner ends of said rollers, said bearing means for the outer ends of the shafts being carried in supporting means disposed at the outer ends of said rollers, the outer ends of certain of said shafts being longer in length than the outer ends of the shafts of the other rollers, and said supporting means disposed at the outer ends of the shafts of said rollers being movably mounted for carrying all of the bearings for the outer ends of the shafts lengthwise with respect to said shafts whereby because of the different lengths of the outer ends of the shafts the rollers may be successively dismounted and assembled in said machine.

7. A method for tenderizing a meat product comprising freezing the product, thereafter flattening the product to stretch the internal fibers thereof to render them taut, and then subjecting said frozen product to a physical tenderizing step during which the taut fibers are severed.

HARRY H. McKEE.
NICHOLAS J. DZIEDZIC.
CHARLES L. STRAETEN.

REFERENCES CITED

The following references are of record in the file of this patent:

UNITED STATES PATENTS

| Number | Name | Date |
|---|---|---|
| 2,274,250 | Simpkins | Feb. 24, 1942 |
| 2,243,492 | Wilson | May 27, 1941 |
| 128,997 | Atkins | July 16, 1872 |
| 274,372 | Perry | Mar. 20, 1883 |
| 608,160 | Snelling | July 26, 1898 |
| 1,784,580 | Deacon | Dec. 9, 1930 |
| 1,976,751 | Short | Oct. 16, 1934 |
| 1,982,487 | Swift | Nov. 27, 1934 |
| 2,163,123 | Huse | June 20, 1939 |
| 2,214,562 | McCadam et al. | Sept. 10, 1940 |
| 1,997,795 | Inman | Apr. 16, 1935 |
| 2,025,505 | Gonser | Dec. 24, 1935 |
| 2,182,379 | Hagan | Dec. 5, 1939 |
| 2,310,067 | Doering et al. | Feb. 2, 1943 |
| 2,051,207 | Ferry | Aug. 18, 1936 |
| 1,973,284 | Huse | Sept. 11, 1934 |

FOREIGN PATENTS

| Number | Country | Date |
|---|---|---|
| 3,991 | Great Britain | 1886 |
| 123,345 | Germany | Aug. 21, 1901 |
| 179,385 | Germany | Dec. 1, 1906 |
| 231,305 | Germany | Feb. 20, 1911 |
| 482,910 | Germany | Sept. 24, 1929 |
| 731,958 | France | June 6, 1932 |